Oct. 26, 1965          L. MAKOUS          3,213,676
ULTRASONIC INSPECTION APPARATUS
Filed Nov. 3, 1961
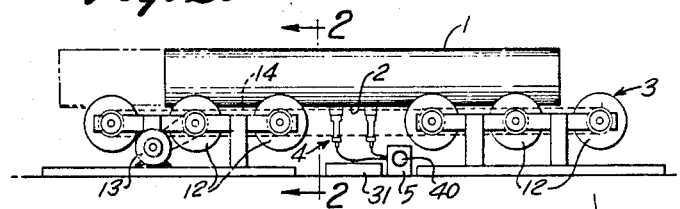
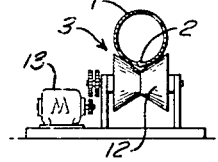
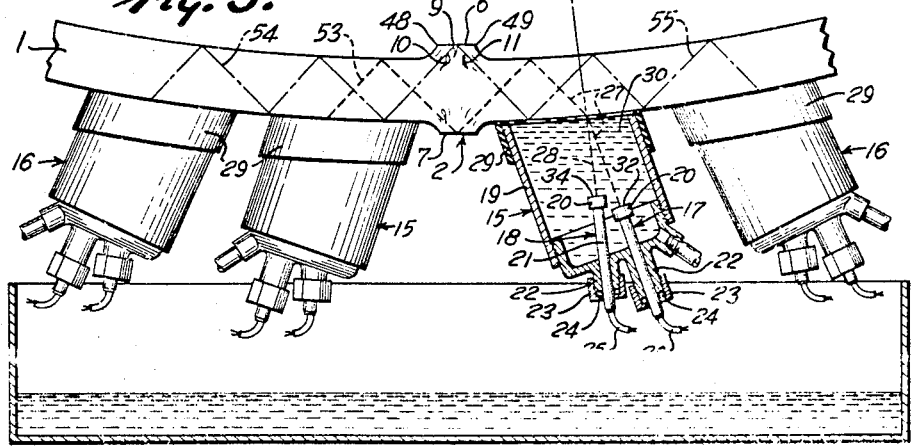
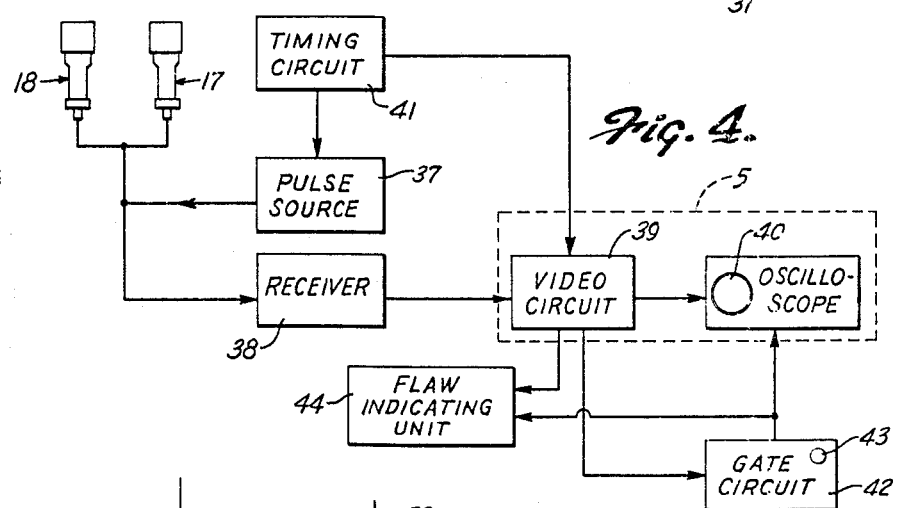
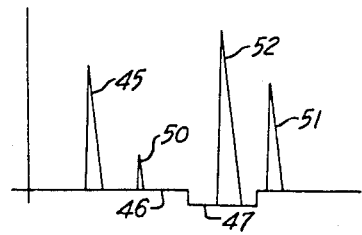
INVENTOR.
LAWRENCE MAKOUS, DECEASED
By RUTH L. MAKOUS, ADMINISTRATRIX
BY Andrus & Starke
Attorneys

United States Patent Office 3,213,676
Patented Oct. 26, 1965

3,213,676
ULTRASONIC INSPECTION APPARATUS
Lawrence Makous, deceased, late of Milwaukee, Wis., by Ruth L. Makous, administratrix, Wauwatosa, Wis., assignor to A. O. Smith Corporation, Milwaukee, Wis., a corporation of New York
Filed Nov. 3, 1961, Ser. No. 150,098
5 Claims. (Cl. 73—67.9)

This invention relates to an apparatus for ultrasonic flaw detection employing a pulse reflection system to identify defects within a limited area of a metal member.

Generally, in ultrasonic flaw detection systems, a high frequency vibration or pulse is established in the part to be inspected which is reflected whenever a normal or perpendicular surface is encountered. A flaw within a metal member establishes a surface which reflects a normal vibration. The path of the vibration in the member is known and consequently the time of travel of the vibration indicates the location of the flaw in the member.

The present invention is particularly directed to a pulse-echo system for inspecting relatively small areas within a metal member and particularly the adjacent surface and sub-surface of the small area such as the longitudinal weld formed in flash welding of pipe.

Flash welded pipe is formed by rolling a plate member into a split tube configuration having longitudinally adjacent edges. A flash welding process is employed wherein a high current is established between the adjacent edges to heat the edges to welding temperatures at which time the edges are forced into each other. The metal of the adjacent edges fuses together establishing a longitudinal weld extending the length of the rolled plate and creates a positive interconnection to form the two edges of the pipe.

During the flash welding process of forming a pipe, the forcing of the adjacent edges together forces the metal to flow generally radially inwardly and outwardly with a formation of inner and outer weld ridges. Generally, the metal in the weld is in the form of an integral mass and provides a strong durable connection. However, due to impurities or the like in the metal or impurities between the adjoining edges which are forced into the weld, a metal separation may be formed which assumes the contour of the flow of the upset metal. The defects appear primarily as small fissures in the inner and outer surfaces of the welds, although some similar sub-surface defects may also be present. The flow of the upset metal is generally radially of the finished pipe and such defects, as are formed, therefore generally are arranged in a radial plane through the pipe and weaken the pipe in the circumferential direction. In high pressure piping such as an oil and gas pipe line installation, the pressure of the flowing fluid tends to burst the pipe and all such weld flaws and defects make the pipe unsuitable and unacceptable for pipe lines and the like.

Such a pipe may be buried in the ground and encased within concrete or the like. Consequently, replacement or repair of a section of the pipe is exceedingly expensive. Repair and replacement cost is greatly increased when the pipe line is disposed upon a river bottom or the like. This is particularly true in areas having low temperatures during a period of a year where the river and the ground may freeze and practically prevent access to the pipe.

Consequently, it is necessary to provide inspection of the inner and outer surfaces of the weld and wherever such defects are located, that section of the pipe removed or, in the case of surface fissures, the fissure removed as by grinding.

Various manual and automatic methods have been employed for inspecting the surface of the weld. Visual personal inspection is employed. X-ray and eddy current inspection devices have been suggested for automatic inspection.

The method employed must be designed to give accurate and reliable control because the purchaser of the pipe makes at least intermittent inspection of the welds to determine the quality of the pipe being received. Obviously, if the purchaser obtains an excessive number of defective pipes which must be returned for correction or which must be corrected in the field, there is a substantial monetary loss as well as possibility of complete loss of the customer's business to a competitor. However, in order to maintain commercial production within economical limits, the inspection method must allow rapid inspection.

Ultrasonic methods of inspection have been developed for accurate and rapid inspection of metal members where the complete member is to be inspected. The present invention is directed to a method and apparatus for inserting ultrasonic pulse signals into the pipe and for concentrating the signals within the weld area. The reflected pulse signals which scan the weld area are isolated to restrict the inspection to the weld area.

In accordance with the present invention, the ultrasonic signals are transmitted through a suitable coupling liquid to the pipe at a predesigned angle with respect to the normal of the pipe surface. The ultrasonic signals travel between the walls of the metal member and engage the weld area at a predetermined angle of incidence with respect to the perpendicular of the surface being inspected. A signal is reflected at any surface substantially normal to the signal for actuation of suitable detectors.

In welded pipes and the like, the direction of flow of the upset metal is generally both circumferentially and radially and certain defects may be angularly related with respect to a radial plane. The desired angle of incidence of the ultrasonic signal may be parallel to the greater portion of certain curved defects. Such signals would not be reflected. In accordance with the present invention, separate and individual ultrasonic signals of a similar characteristic are transmitted from opposite sides of the weld to scan the weld at substantially perpendicular paths. Consequently, if one signal is parallel to a substantial portion of a defect, the opposite signal is essentially at a right angle thereto. The latter perpendicular signal establishes an output of sufficient amplitude to accurately and positively identify the flaw in the weld.

Further, in welded pipes and the like, only the welded area is to be inspected. In accordance with the present invention, suitable pilot signals are established to open and close a gate to isolate the signals being reflected from witihn the weld area. The pilot signal is sent out simultaneously with the inspection signal and reflected from a suitable surface before the shortest reflected wave in the inspection signal. For example, in the inspection of welded pipe, the pilot signals are reflected from the immediately adjacent outer pipe surface. The pilot signal after suitable amplification is connected to operate a gate to control a flaw registering or detecting device or other suitable control in accordance with the time of shortest weld area reflected signal.

In flash welded pipe and the like, as previously described, both the inner and outer surface of the weld must be inspected. In accordance with another feature of the present invention, both of the surfaces are simultaneously inspected. Inspection signals, spatially displaced, are simultaneously transmitted through the pipe to establish vibration signals which simultaneously scan the oppoistely upset portions of the weld.

The present invention thus provides fast, production-type inspection for pipe during normal production. Flaw defects which adversely affect the strength of the pipe are reliably located and consequently the defective area can be removed before the pipe is sent out for connection into a pipe line or the like.

The drawing furnished herewith illustrates the best mode presently contemplated for carrying out the invention.

In the drawing:

FIG. 1 is an elevational view diagrammatically illustrating a flash welded pipe mounted in an ultrasonic flaw detection unit constructed in accordance with the present invention;

FIG. 2 is an end view of FIG. 1;

FIG. 3 is an enlarged fragmentary view taken through a weld section of the flash welded pipe;

FIG. 4 is a block diagram of a circuit illustrating the several components for indicating the location of a defect in a pipe; and FIG. 5 is an enlarged diagrammatic trace illustrative of a pulse train in the presence of a defect.

Referring to the drawing and particularly to FIG. 1, an elongated tubular pipe 1 includes a longitudinal weld 2 extending axially for the complete length of the pipe. The tubular pipe 1 is mounted upon a conveyor 3 with the longitudinal weld 2 in alignment with an ultrasonic flaw detector assembly 4. The conveyor 3 movably supports the pipe 1 for successive movement of the weld 2 past the ultrasonic flaw detector assembly 4. An oscilloscope 5 is incorporated as a portion of the ultrasonic flaw detector assembly 4 to provide a visual illustration of a flaw in the weld 2.

The tubular pipe 1 is of any generally conventional flash welded construction. Generally, a flat sheet of metal, not shown, is rolled to establish abutting edges which are integrally connected by a flash welding process to establish the longitudinal weld 2.

Referring particularly to FIG. 3, the weld 2 includes an outer ridge 7 and an inner ridge 6 which result from the abutting forces applied to the opposite sides of the pipe during the flash welding process. If the metal in the pipe 1 prior to welding includes any impurities or voids or if foreign matter is present between the edges to be flash welded, they appear in the final weld as defects such as shown at 9, 10 and 11 in the respective weld ridges 6 and 7. Defect 9 is shown as a surface opening extending radially and centrally of the weld 2. Defects such as defect 9 are generally caused by foreign matter between the edges of the pipe 1 before the edges are forced together. Such defects are commonly known as penetrators.

To the left of the defect 9 in FIG. 3, defect 10 is illustrated which may result from a void or an impurity in the metal. As illustrated, the defect 10 extends circumferentially and then radially outwardly generally in accordance with the flow lines of the upset metal. The defect 11 shown to the right in FIG. 3 is generally similar to the defect 10.

Such defects 9, 10 and 11 weaken the pipe 1 in the circumferential direction and consequently when the pipe 1 is inserted in a pressure system, bursting of the pipe at those particlar locations may result.

In accordance with the present invention, the weld 2 is progressively moved by the conveyor 3 past the ultrasonic flaw detector assembly 4 which accurately locates and identifies any such defects as those illustrated typically by defects 9, 10 and 11.

The illustrated conveyor 3 comprises a plurality of supporting rollers 12 disposed on opposite sides of assembly 4. Each roller 12 has a V-shaped supporting periphery to receive and properly locate the pipe 1. A motor 13 is connected through a suitable chain drive 14 to simultaneously rotate the rollers 12. The frictional forces between the periphery of driven rollers 12 and pipe 1 result in the continued movement of the pipe 1 at a uniform speed with respect to the ultrasonic flaw detector assembly 4.

Generally, the ultrasonic flaw detector assembly 4 includes a first pair of ultrasonic signal generating units 15 located on opposite sides of weld 2 and arranged to inspect the outer ridge 7. Assembly 4 includes a second pair of ultrasonic signal generating units 16 located on opposite sides of weld 2 adjacent units 15 and arranged to inspect the inner ridge 6. Each of the signal units 15 and 16 is similar and a single description of the structure of one of the units 15 is given.

Referring particularly to FIG. 3, signal unit 15 includes an inspection signal transducer assembly 17 and a pilot signal transducer assembly 18 secured within a coupling housing 19.

Each of the transducer assemblies 17 and 18 includes a standard piezoelectric transducer or crystal 20, such as shown and described in United States Patent 2,873,391, and mounted upon a high frequency transmission stem 21 which projects rearwardly through housing 19. Stems 21 project outwardly through similar threaded bosses 22 in the rear wall of housing 19 and sealing caps 23 are secured on bosses 22 with an O-ring seal 24 interposed therebetween to adjustably lock the transducer assemblies 17 and 18 in position. Coaxial leads 25 and 26 are connected one each to stems 21 of assemblies 17 and 18 to simultaneoeusly energize the crystals 20 of the transducer assemblies 17 and 18 and establish an inspection vibration beam 27 and a pilot vibration beam 28 directed toward pipe 1. The beams 27 and 28 are generally conically shaped with the narrowest dimension at the emitting face of the crystals.

The crystal 20 of the pilot signal transducer assembly 18 is mounted slightly closer to pipe 1 to insure proper functioning of the illustrated embodiment of the invention, as hereinafter described.

A flexible tubular extension 29 is secured to the terminal end of the housing 19 immediately adjacent the pipe 1 and is adapted to slidably engage the pipe 1. Water 30 continuously flows upwardly through the tubular housing 19 and the flexible extension 29 to maintain a water coupling between the crystals 20 and the outer surface of the pipe 1. The pressure of water 30 is sufficiently low to prevent turbulence and thus prevents air bubbles from being formed which would interfere with the coupling of the vibrations to the pipe 1.

A wetting agent is preferably added to the water to break the water surface tension and protect against formation of an air film immediately adjacent the pipe 1. A rust inhibitor should also be added to the water to protect against rusting and corrosion of the components of the assemblies.

A water basin 31 is mounted immediately below the transducer units 15 and 16 to accumulate the water flowing outwardly past the edges of extensions 29.

The crystal 20 of transducer assembly 17 which establishes the inspection signal terminates in a face 32 of sufficient size and shape to establish the beam 27 of a width at the weld 2 equal to or greater than the width of weld 2.

Where assemblies 4 are to be employed to inspect various size welds, a focusing nozzle, not shown, may be employed to provide a proper sized and shaped beam for the particular weld to be inspected.

Each beam 27 engages the pipe at a predetermined angle and then moves back and forth between the outer and inner wall surfaces defining the pipe 1. If one of defects 9–11 is encountered, the portion of the sound beam 27 perpendicularly encountering the defect is reflected back over the forward path. The reflected sound beam strikes the crystal 20 and establishes an output signal which indicates the location of the defect, as more fully described hereinafter. The reflected signal is received by crystal 20 during the period between the successive time-spaced inspection beams 27 that are transmitted.

The path of sound beam 27 for any given angular position of the face 32 of crystal 20, thickness of pipe 1 and circumferential location of weld 2 from the crystal 20 can be determined in accordance with known phenomena. The speed of the sound beam 27 through the water 30 and through the pipe 1 is also known. The time for a sound beam 27 to travel through the pipe 1 and scan the weld 2, as well as the time for a reflected signal to return to the crystal 21 is consequently known. The crystal 20 of transducer assembly 17 is actuated to properly space sound beams 27 and allow each of the sound beams to scan the weld 2 and be reflected back to the crystal 20 before the next succeeding sound beam 27 is established.

The pilot signal transducer assembly 18 establishes a signal which is impressed on the oscilloscope 5 and modifies the visual display to define the weld area in which the defect can occur.

Transducer assembly 18 as previously described, is similar to transducer assembly 17 and includes an emitting surface or face 34 from which the pilot beam 28 is emitted. Face 34 is generally perpendicular to a radial line of the pipe 1 and establishes a generally radially projected beam 28 which is therefore perpendicular to the adjacent outer pipe surface. The pilot beam 28 is reflected directly from the pipe surface to the crystal 20 of transducer assembly 18.

The pilot transducer assembly 18 is somewhat closer to pipe 1 than the inspection transducer assembly 17. The reflected pilot signal is therefore always received by transducer assembly 18 prior to return of a reflected inspection signal to transducer assembly 17.

The output of the transducer assembly 18 is connected in the circuit for actuating the scope 5 to superimpose a visual indication on the scope display which is related to the weld zone.

Referring particularly to FIG. 4, a circuit for one of the signal units 15 is schematically shown. An intermittent pulse source 37 is parallel connected to the crystals 20 of transducer assemblies 17 and 18 for simultaneous energizing of the transducers. A series of time-spaced beams 27 and 28 are thereby generated. The signal or beam 27 from the transducer assembly 17 is transmitted through the water 30 and pipe 1 to the weld 2 and reflected by any normal surface to the transducer assembly 17. The signal or beam 28 is transmitted through the water 30 and reflected by the pipe surface to the transducer assembly 18. A signal receiver 38 is also connected to the transducer assemblies 17 and 18 to pick up the reflected signals. A video circuit 39 of scope 5 is connected to the output of receiver 38 and actuated is hereinafter described to produce a visual indication of such reflected signals upon a visual display portion 40 of scope 5.

A timing device 41 is connected to the pulse source 37 and the video circuit 39. The timing device 41 actuates the pulse source 37 to provide the time spaced pulses to actuate assemblies 17 and 18. The timing device 41 further actuates scope 5 to provide a visual sweep in synchronism with the generated pulses of the pulse source 37 and to prevent triggering of scope 5 by the pulses from the pulse source which are fed to receiver 38.

A gate circuit 42 also connects the video circuit 39 to the display section of oscilloscope 5 and is actuated by the reflected pulse from the pilot transducer assembly 18 to clearly delineate on the display portion 40, the area under inspection for flaws. The gate circuit 42 in the illustrated embodiment is a timing circuit of any suitable construction for timed operation of the oscilloscope 5 as hereinafter described. The width or area under inspection is controlled by manual adjustment of the gate circuit 42 through a suitable control lever or knob 43. The actual circuitry and connection of knob 43 will be obvious to those skilled in the art and no further detailed explanation of the circuitry is deemed necessary or advisable.

A flaw indicating unit 44 is similarly and parallel connected directly to the output of the video circuit 39 and to the gate circuit 42. The unit 44 may for example be an automatic marking mechanism mounted to place a mark on the pipe 1 at the location of a defect.

The inspection beam 27 is substantially parallel to the greater portion of a defect 11 within the weld 2. Consequently, the reflected signal is too small to provide as positive and reliable an indication of a defect as normally required.

Referring to FIG 5, a graphical illustration of the output of one unit 15 or 16 is illustrated. Time or distance is expressed upon the horizontal axis and a voltage signal representing a reflected sound beam is expressed upon the vertical axis by small spikes or pips.

The first signal pip 45 in FIG. 5 is established by the pilot beam 28 of the pilot transducer assembly 18 which is transmitted to pipe 1 and reflected to crystal 20 and then fed from receiver 38 to the video circuit 39. The signal pip 45 operates the gate circuit 42 to vary the vertical position of a base or reference line 46 after a predetermined time and for a selected period corresponding to the time of travel for a reflected inspection signal of shortest and longest length from the weld 2, as shown by the stepped depression 47. The width of the stepped depression 47 is adjusted by the variable control knob 43 which varies or adjusts the time operating sequence of the timing or gate circuit 42. Thus, in operation, the initial signal from the video circuit 39 is simultaneously fed to the scope 40 and to the gate circuit 42. The gate circuit, as previously noted, is a suitable timing device and may include a suitable time relay, electronic timing circuit or the like which is triggered or actuated to provide an output signal for simultaneous impression or feeding to the oscilloscope and to the flaw indicating unit. The illustrated gate circuit 42 is selected with a dual timing such that it provides an output signal a preselected time after the initial triggering signal is applied thereto and then maintains the output signal for a second selected period. Thus, the depression 47 does not begin until the first selected time period shown diagrammatically in FIG. 5 as the distance between the pip 45 and the sharp vertical line forming the forward edge of the depression 47. At the position of this leading edge of depression 47, the output signal is established by the circuit 42 and fed to the scope 40 to cause it to move its reference line downwardly to the lower lever for the second selected time period after which it reverts to the starting level.

Simultaneously, the output of the gate circuit 42 is fed to the flaw indicating unit. The indicating unit, as previously noted may be any suitable device such as an automatic marking mechanism. Generally, it may include a relay mechanism or other suitable device which is normally conditioned to be inoperative but which upon receipt of the signal from gate 42 is conditioned to operate. For example, an electronic switching means may be provided normally disconnecting the unit from a power source and connecting it to the power source in response to the signal from circuit 42. The flaw indicating unit will then be in condition to provide an output such as a marking in response to subsequent signals from the video circuit 39. In this way, the flaw indicating unit 44 in essence operates in parallel with the scope 40 to provide a different type of output rather than the visual output of the scope 40. At the end of the second timing period of the circuit 42, the signal is automatically removed from the unit 44 and from the scope 40. In this manner, the area being inspected is delineated on the reference line and one viewing the reference can determine defects noted within the depressed area and thus within the area under inspection. Similarly, the operation of the flaw detecting unit 44 is restricted to a corresponding time period corresponding to that of the depressed reference area of the scope 47 such that its output which may be a mechanical, a sound alarm or the like will only occur within the depressed corresponding time period and thus respond only to signals corresponding to those within the depressed area. The display portion thereby clearly distinguishes between signals created within the weld 2 as distinguished from the other portions of pipe 1. The gate circuit 42 is normally adjusted to exclude the reflected signals established by the side edges 48 and 49 of the weld 2 from the area of the stepped depression 47. The reflected signals from edges 48 and 49 appear as small pips 50 and 51 on opposite sides of stepped depression 47.

When a defected 9–11 is encountered, a voltage signal is established which is visually recorded on the oscilloscope 5 by a pip 52. All other signals appear outside of the stepped depression and consequently, only defect signals will actuate the indicating unit 44.

The speed of sound is sufficiently great that the successive pulses from the transducer assemblies 17 and 18 can be closely spaced to within complete scanning of weld 2 during an uninterrupted rapid movement of the pipe 1.

In accordance with the present invention, the unit 15 to the left of weld 2 in FIG. 3 establishes a mirror image of the signal output of opposite unit 15. An inspection beam 53 generally similar but perpendicular to beam 27 is created within weld 2. The second inspection beam 53 is therefore substantially normal to the defect 11 and is highly reflected. The reflected signal establishes a positive output signal in the corresponding crystal 20.

Consequently, by simultaneously scanning the weld 2 from opposite sides, the weld zone within ridge 7 is continuously and completely inspected for any radially extending flaws which weaken the pipe 1 to the extent necessitating rejection or repair.

Similarly, the weld zone within inner ridge 6 is inspected by the pair of units 16 which are spaced circumferentially outwardly from the weld 2. Units 16 establish inspection beams 54 and 55 which are introduced into the pipe 1 from opposite sides of the weld 2. The beams 54 and 55 are located such that they enter the pipe 1 and after rebounding from the inner surface defining pipe 1 are reflected to be coincident with the inner surface of the ridge 6. Units 16 are otherwise constructed and function generally in the same manner as the previously described units 15.

The operation of the illustrated embodiment of the invention is summarized as follows:

The pipe 1 is mounted within the conveyor 3 with the weld 2 in alignment with the flaw detector assembly 4. The pipe 1 is then rapidly moved longitudinally with the weld 2 successively passing over the flaw detector assembly 4. The transducers 20 of the several signal units 15 and 16 are simultaneously energized by pulse sources 37 to establish a series of individual time-spaced inspection beams which travel through the water 30 and pipe 1 into the weld zone, as previously described. The timing circuit 41 provides proper timing of the pulse source 37 and the generation of the pulse beams as well as providing synchronization of visual display on oscilloscope 5 with these pulses.

The initial reflected pilot beam triggers the gate 42 to clearly delineate on oscilloscope 5 the area being inspected and enables the flaw indicating unit 44. Any of the inspection beams 27 and 53–55 which encounter a defect 9–11 is reflected and simultaneously actuates the oscilloscope 5 to provide a visual display of the defect location and the indicating unit 44 to produce a marking, audible signal or the like depending on the type of device employed.

Referring particularly to FIG. 3, the outer edges 48 and 49 of weld 2 are illustrated as being relatively sharp and well-defined. As previously described, each edge 48 and 49 establishes a reflected signal shown by pips 50 and 51 in FIG. 5 and the signals may be employed to trigger the gate 42. The pilot transducer assembly 18 can then be eliminated. The pipe 50 represents the shortest path to the weld 2 and is created by an initial reflected signal from the edge 48 or 49 nearest the respective assembly 18 to open gate 42 for a selected period. The pip 51 represents the longest path to weld 2 and the gate 42 is closed just prior to receipt of the pip 51 and thereby establishes the weld zone as the only area from which reflected signals would actuate the flaw device 44.

The latter control is dependent on the sharpness of the edges 48 and 49 and is not practicable for commercially flash welded pipe and the like except to locate large defects. Where reliability and quality requirements are stringent, the pilot transducer is generally more desirable and practicable because of the positive control provided.

The present invention thus provides a very reliable method of rapidly inspecting limited areas of elongated metal members, such as the welds in a flash welded pipe. The quality of mass produced flash welded pipe and the like can be raised to an exceptionally high level in accordance with the present invention.

Various modes of carrying out the invention are contemplated as being within the scope of the following claims particularly pointing out and distinctly claiming the subject matter which is regarded as the invention.

What is claimed is:

1. In a device for inspecting a selected area of a member for flaws extending generally normal to the surface of the member, which comprises a main ultrasonic pulse beam generator for generating a series of pulse beams, a pilot ultrasonic pulse beam generator for generating a similar series of pulse beams, a fluid coupling between the generators and the member to one side of the selected area, the main generator being arranged to transmit the pulse beam into the member at a selected angle of incidence different than ninety degrees to be reflected between the surfaces thereof and to coincide with the selected area, the pilot pulse beam generator being arranged to transmit the pulse beams perpendicularly to the outer surface of the member and thereby reflected from the outer surface and establishing a gating pulse, a signal responsive means having a control input means which is connected to said generators and having a pair of control output means for establishing a pair of output signals, a flaw indicating unit having a pair of input means one of which is connected to one of said control output means, a timed gate means connected to the other of said control output means of the signal responsive means and to said flaw indicating unit and responsive to a gate pulse to condition said indicating unit to operatively respond to signals from the signal responsive means and produce an indication of flaw related pulse signals from within the selected area.

2. The device of claim 1 having a second main ultrasonic pulse beam generator for generating a second series of pulse beams which engage the selected area of the member, said second series of pulse beams being at substantially ninety degrees to the first series of pulse beams at the selected area of the member, a second pilot ultrasonic pulse beam generator to establish a gating pulse, a second signal responsive means having a control input means which is connected to said second generators and having a pair of control output means for establishing a pair of output signals, a second flaw indicating unit having a pair of input means one of which is connected to one of said control output means of said second signal responsive means, a second timed gate means connected to the other of said control output means of the second signal responsive means and to said second flaw indicating unit and responsive to a gate pulse to condition said second flaw indicating unit to operatively respond to signals from the second signal responsive means and produce an indication of flaw related pulse signals.

3. Apparatus for detecting flaws in a longitudinal flash weld in a tubular member, which comprises means supporting the tubular member with the flash weld on the underside of the tubular member, a first pair of ultrasonic signal generating units circumferentially spaced to one side of the flash weld, a second pair of ultrasonic signal generating units similarly circumferentially spaced to the opposite side of the flash weld, means to relatively move the flash weld between said generating units, each of said signal generating units including a cup-shaped housing mounted with the open end facing upwardly in closely spaced relation to the path of the tubular member, each of said signal generating units including a pair of ultrasonic crystals arranged as a gating crystal and an inspection crystal, an ultrasonic coupling medium within each housing to establish coupling of the crystals to the tubular member, crystal energizing means to energize said inspection crystals to establish similar time-spaced ultrasonic pulse beams transversely of the tubular member and at an angle of incidence to the surface of the member whereby the pulse beams reflect between the inner and outer walls of the member into coincidence with the weld surfaces, the ispection crystals on the same side of the weld generating pulse beams displaced to engage the opposite surface portions of the flash weld, the inspection crystals on opposite sides of the weld having the pulse beams displaced to establish perpendicularly related pulse beams scanning each surface of the weld, said crystal energizing means simultaneously energizing the gating crystals and establishing gating pulse beams in synchronism with said inspection crystals, said gating pulse beams being reflected from the adjacent aligned surface of the tubular member, flaw indicating means, a timing means connected to the flaw indicating means and the means to energize the crystal to block the generated pulse beams from the flaw indicating means, and gating circuitry responsive to the pilot pulse beams to enable the flaw indicating means only during the period of receiving reflected pulse beams from within the flash weld.

4. Apparatus for detecting flaws in a longitudinal flash weld in a tubular member, which comprises a carriage means supporting the tubular member for axial movement with the flash weld on the underside of the tubular member, a first pair of ultrasonic signal generating units circumferentially spaced on one side of the path of the flash weld, a second pair of ultrasonic signal generating units similarly circumferentially spaced to the opposite side of the flash weld, each of said signal generating units including a cup-shaped housing mounted with the open end facing upwardly in closely spaced relation to the path of the tubular member, means to continuously supply an ultrasonic coupling medium to each housing to establish coupling of the generating units to the tubular member, each of said signal generating units including a pair of ultrasonic crystals, means to energize said crystals to establish similar time-spaced ultrasonic pulse beams, the pairs of ultrasonic crystals being arranged as a gating crystal and an inspection crystal, said inspection crystals being energized to establish pulse beams transversely of the tubular member and at an angle of incidence to the surface of the member whereby the pulse beams reflect between the inner and outer walls of the member into coincidence with the weld surfaces, the inspection crystals on the same side of the weld generating pulse beams being displaced to engage the opposite surface portions of the flash weld, the corresponding inspection crystals on opposite sides of the weld establishing perpendicularly related pulse beams scanning each surface of the weld, the gating crystals establishing gating pulse beams in synchronism with said inspection crystals and in a direction substantially normal to the surface of the tubular member for direct relation from the adjacent surface, flaw alarm means, individual circuit means connecting the flaw alarm means to the crystals, a timing means connected in the individual circuits and the means to energize the crystal to block the generated pulse beams from the flaw alarm means, and gating circuitry in each individual circuit means responsive to the pilot pulse beams to enable the flaw alarm means only during the period of receiving reflected pulse beams from within the flash weld.

5. The device of claim 1 including a housing within which both of said generators are mounted and said housing includes an opening through which both of the pulse beams are transmitted, said generators being mounted such that both of the pulse beams engage substantially the same area of the surface of the member.

References Cited by the Examiner

UNITED STATES PATENTS

| 2,527,986 | 10/50 | Carlin | 73—67.8 |
| 2,628,335 | 2/53 | Drake | 73—67.7 X |
| 2,682,766 | 7/54 | Van Valkenburg | 73—67.9 |
| 2,740,289 | 4/56 | Van Valkenburg et al. | 73—67.9 |
| 2,751,783 | 6/56 | Erdman | 73—67.8 |
| 2,799,157 | 7/57 | Pohlman | 73—67.7 |
| 2,846,875 | 8/58 | Grabendorfer | 73—67.8 |
| 2,873,391 | 2/59 | Schulze | 73—67.9 X |
| 2,893,239 | 7/59 | Renaut | 73—67.7 |

FOREIGN PATENTS

| 716,687 | 10/54 | Great Britain. |
| 862,031 | 3/61 | Great Britain. |
| 866,457 | 4/61 | Great Britain. |

RICHARD C. QUEISSER, *Primary Examiner.*

JOHN P. BEAUCHAMP, *Examiner.*

UNITED STATES PATENT OFFICE
CERTIFICATE OF CORRECTION

Patent No. 3,213,676                                  October 26, 1965
Lawrence Makous, deceased, by
Ruth L. Makous, administratrix It is hereby certified that error appears in the above numbered patent requiring correction and that the said Letters Patent should read as corrected below.

Column 3, line 2, for "oppoistely" read -- oppositely --; column 7, line 15, for "defected" read -- defect --; line 22, for "within" read -- maintain --; column 9, line 25, for "ispection" read -- inspection --; column 10, line 19, for "relation" read -- reflection --.

Signed and sealed this 11th day of October 1966.

(SEAL)
Attest:

ERNEST W. SWIDER                                EDWARD J. BRENNER
Attesting Officer                                      Commissioner of Patents